US010818975B2

(12) United States Patent
Otaki et al.

(10) Patent No.: US 10,818,975 B2
(45) Date of Patent: Oct. 27, 2020

(54) METHOD FOR PRODUCTION OF ALL-SOLID-STATE BATTERY

(71) Applicant: TOYOTA JIDOSHA KABUSHIKI KAISHA, Toyota-shi, Aichi-ken (JP)

(72) Inventors: Mitsutoshi Otaki, Susono (JP);
Norihiro Ose, Shizuoka-ken (JP);
Shigenori Hama, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 73 days.

(21) Appl. No.: 16/128,893

(22) Filed: Sep. 12, 2018

(65) Prior Publication Data
US 2019/0148765 A1    May 16, 2019

(30) Foreign Application Priority Data
Nov. 10, 2017   (JP) .................................. 2017-217735

(51) Int. Cl.
*H01M 4/04*       (2006.01)
*H01M 4/38*       (2006.01)
(Continued)

(52) U.S. Cl.
CPC ....... *H01M 10/058* (2013.01); *H01M 4/0402* (2013.01); *H01M 4/1395* (2013.01);
(Continued)

(58) Field of Classification Search
CPC .. H01M 4/402; H01M 4/1395; H01M 10/058; H01M 4/386; H01M 10/445; H01M 10/446
See application file for complete search history.

(56) References Cited

U.S. PATENT DOCUMENTS

2015/0134172 A1    5/2015  Ose et al.
2015/0236373 A1*   8/2015  Ohtomo .................. C03C 3/321
                                              264/104
(Continued)

FOREIGN PATENT DOCUMENTS

JP       2015-095281 A    5/2015
JP       2016-081790 A    5/2016
(Continued)

*Primary Examiner* — Ula C Ruddock
*Assistant Examiner* — Frank A Chernow
(74) *Attorney, Agent, or Firm* — Dickinson Wright, PLLC

(57) ABSTRACT

[Problem] To provide a method for the production of an all-solid-state battery using an alloy-based negative electrode active material in which it is possible to suppress degradation in performance of the all-solid-state battery during actual use while the restraint pressure during actual use of the all-solid-state battery is relatively small.

[Solving Means] The method for producing an all-solid-state battery of the present disclosure produces an all-solid-state battery having a battery laminate comprising a positive electrode current collector layer, a positive electrode active material layer, a solid electrolyte layer, a negative electrode active material layer, and a negative electrode current collector layer laminated in this order, wherein the battery laminate is restrained in the lamination direction by an actual use restraint member. The negative electrode active material layer contains particles of an alloy-based negative electrode active material. The method of the present disclosure comprises the steps of, in this order, charging and discharging the battery laminate in a state in which the batter, laminate is restrained in the lamination direction by a manufacturing restraint member and restraining the battery laminate in the lamination direction by the actual use restraint member, wherein when the restraint pressure applied by the manufacturing restraint member at the end of the discharging is a fourth restraint pressure and the restraint (Continued)

pressure applied by the actual use restraint member at the end of the discharging is a fifth restraint pressure, the fourth restraint pressure is greater than the fifth restraint pressure.

10 Claims, 1 Drawing Sheet

(51) Int. Cl.
    *H01M 10/44*     (2006.01)
    *H01M 10/05*     (2010.01)
    *H01M 10/058*     (2010.01)
    *H01M 10/0562*     (2010.01)
    *H01M 4/1395*     (2010.01)
    *H01M 10/052*     (2010.01)
    *H01M 4/02*     (2006.01)

(52) U.S. Cl.
    CPC ......... *H01M 4/386* (2013.01); *H01M 10/052* (2013.01); *H01M 10/0562* (2013.01); *H01M 10/445* (2013.01); *H01M 10/446* (2013.01); *H01M 2004/027* (2013.01)

(56) References Cited

U.S. PATENT DOCUMENTS

2015/0380763 A1* 12/2015 Ohtomo ................ H01M 4/382
                                                                                            429/304
2017/0077732 A1     3/2017   Otaki et al.

FOREIGN PATENT DOCUMENTS

JP         2017-059534 A     3/2017
KR        10-2017-092296     8/2017

* cited by examiner

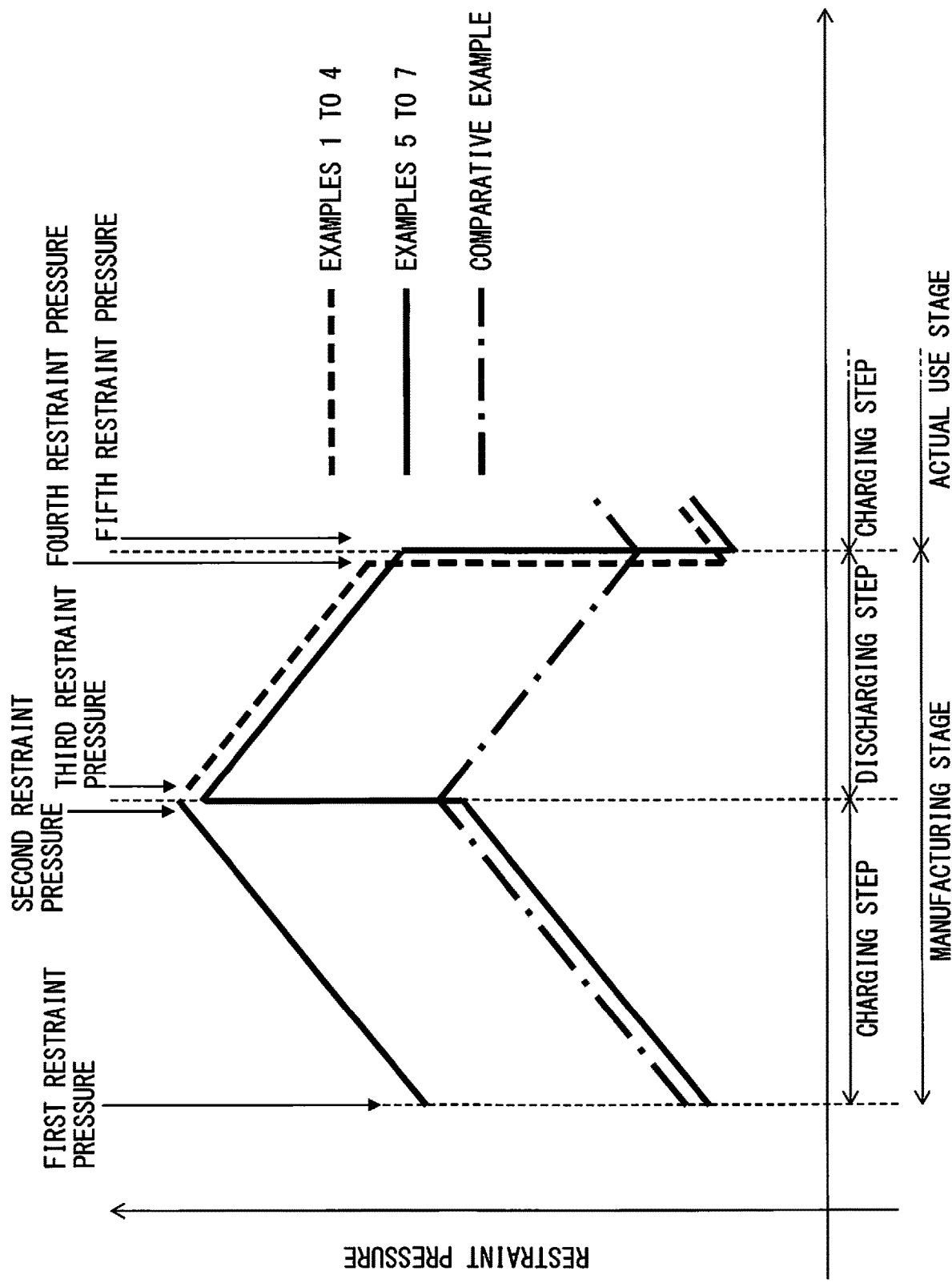

METHOD FOR PRODUCTION OF ALL-SOLID-STATE BATTERY

FIELD

This application claims the benefit of foreign priority to Japanese Patent Application No. JP2017-217735, filed Nov. 10, 2017, which is incorporated by reference in its entirety.

The present disclosure relates to a method for the production of an all-solid-state battery.

In recent years, all-solid-state batteries in which the electrolytic solution is replaced with a solid electrolyte have attracted attention. As compared with secondary batteries using an electrolytic solution, in all-solid-state batteries, which do not use an electrolytic solution, there is no decomposition of the electrolytic solution due to overcharging of the battery, and such batteries have high cycle durability and energy density.

Such an all-solid-state battery typically includes a battery laminate having a positive electrode current collector layer, a positive electrode active material layer, a solid electrolyte layer, a negative electrode active material layer, and a negative electrode current collector layer laminated in this order. Charging and discharging of the battery is achieved by transferring ions, such as lithium ions, that exchange electrons between the positive electrode active material layer, the solid electrolyte layer, and the negative electrode active material layer.

In order to improve performance, such as the energy density, of an all-solid-state battery, it is desirable to use a negative electrode active material having a large theoretical capacity. Currently, as the negative electrode active material, carbon-based negative electrode active materials, such as graphite, are common but alloy-based negative electrode active materials, such as silicon-based alloys, are known to have a higher theoretical capacity than carbon-based negative electrode active materials.

However, alloy-based negative electrode active materials cause significant expansion and contraction during charging and discharging of an all-solid-state battery. Thus, when charging and discharging the all-solid-state battery, it is known that the volume of the negative electrode active material layer including particles of this alloy-based negative electrode active material fluctuates, whereby contact of the solid-state interface between the particles contained in the negative electrode active material layer is severed, or the contact area decreases, and as a result, battery performance, such as charge-discharge capacity, deteriorates.

In order to prevent deterioration of performance accompanying such charging and discharging, it has been proposed that the all-solid-state batteries using an alloy-based negative electrode active material be used in a state in which the battery is restrained at a high pressure.

However, in order to restrain the all-solid-state battery, a restraining member of a size corresponding to the restraint pressure is necessary, and thus, to achieve a high restraint pressure, a large restraining member is necessary. As a result, in an all-solid-state battery in which a high pressure is necessary, a large restraining member corresponding to the restraint pressure is needed, causing the energy density of the all-solid-state battery including the restraining member to decrease.

The method for the production of an all-solid-state battery system of Patent Literature 1 includes a lamination step of laminating a positive electrode active material layer, a solid electrolyte layer, and a negative electrode active material layer containing particles of an alloy-based negative electrode active material and an initial charging step of charging the all-solid-state battery to an initial charging voltage higher than the charging and discharging voltage. In the Examples of Patent Literature 1, the all-solid-state battery was restrained at a torque of 2 N·m.

The method for the production of an all-solid-state secondary battery of Patent Literature 2 includes an assembly step of assembling a battery having a positive electrode active material layer, a negative electrode active material layer, and a sulfide solid electrolyte layer disposed therebetween, an initial charging step of performing constant-current constant-voltage charging for the battery assembled in the assembly step, a constant-voltage charging step of charging at a constant voltage following the initial charging step, and an initial discharging step of performing initial constant-current constant-voltage discharging after the constant-voltage charging step. The constant-voltage charging step is a step of performing constant-voltage charging while imparting a restraining pressure of 0.1 MPa to 10 MPa to the battery in a temperature environment of 40° C. to 60° C.

The charging system of the all-solid-state battery of Patent Literature 3 includes a charging unit for charging the all-solid-state battery, a pressurizing unit for applying a restraint pressure to the all-solid-state battery, and a pressure controller for controlling the restraint pressure, wherein the pressure controller instructs the pressurizing unit so that the restraint pressure during charging is higher than the restraint pressure at discharging.

CITATION LIST

Patent Literature

[Patent Literature] Japanese Unexamined Patent Publication (Kokai) No. 2017-59534
[Patent Literature 2] Japanese Unexamined Patent Publication (Kokai) No. 2016-81790
[Patent Literature 3] Japanese Unexamined Patent Publication (Kokai) No. 2015-95281

SUMMARY

Technical Problem

The present disclosure aims to provide a method for the production of an all-solid-state battery which can suppress a degradation in performance of the all-solid-state battery during actual use, while using an alloy-based negative electrode active material and relatively small restraint pressure during actual use of the all-solid-state battery.

Solution to Problem

The present disclosures have found that the above problems can be solved by the following means.

Embodiment 1

A method for the production of an all-solid-state battery having a battery laminate comprising a positive electrode current collector layer, a positive electrode active material layer, a solid electrolyte layer, a negative electrode active material layer, and a negative electrode current collector layer laminated in this order, the battery laminate being restrained in the lamination direction by an actual use restraint member, wherein the negative electrode active material layer contains particles of an alloy-based negative electrode active material, the method comprises the following steps in the following order:

charging and discharging the battery laminate in a state in which the battery laminate is restrained in the lamination direction by a manufacturing restraint member, and restraining the battery laminate in the lamination direction by the actual use restraint member, and when a restraint pressure applied by the manufacturing restraint member at the start of the charging is a first restraint pressure, a restraint pressure applied by the manufacturing restraint member at the end of the charging is a second restraint pressure, a restraint pressure applied by the manufacturing restraint member at the start of the discharging is a third restraint pressure, a restraint pressure applied by the manufacturing restraint member at the end of the discharging is a fourth restraint pressure, and a restraint pressure applied by the actual use restraint member at the end of the discharging is a fifth restraint pressure, then the fourth restraint pressure is greater than the fifth restraint pressure.

Embodiment 2

The method for production according to Embodiment 1, wherein the fourth restraint pressure is 1.25 times or more of the fifth restraint pressure.

Embodiment 3

The method for production according to Embodiment 1 or 2, wherein the fourth restraint pressure is 30.00 times or less of the fifth restraint pressure.

Embodiment 4

The method for production according to any one of Embodiments 1 to 3, wherein the first through fourth restraint pressures are greater than the fifth restraint pressure.

Embodiment 5

The method for production according to Embodiment 4, wherein the first through fourth restraint pressures are 1.25 times or more of the fifth restraint pressure.

Embodiment 6

The method for production according to Embodiment 4 or 5, wherein the first through fourth restraint pressures are 30.00 times or less of the fifth restraint pressure.

Embodiment 7

The method according to any one of Embodiments 1 to 6, wherein the fifth restraint pressure is 10 MPa or less.

Embodiment 8

The method according to any one of Embodiments 1 to 7, wherein the fifth restraint pressure is 0.1 MPa or more.

Embodiment 9

The method according to any one of Embodiments 1 to 8, wherein the step of charging and discharging in which the battery laminate is restrained by the manufacturing restraint member is an initial charging and discharging of the all-solid-state battery.

Embodiment 10

The method according to any one of Embodiments 1 to 9, wherein the alloy-based negative electrode active material includes at least silicon.

Advantageous Effects of Invention

According to the method for producing an all-solid-state battery of the present disclosure, an all-solid-state battery, which can suppress degradation in performance during actual use can be obtained, while using an alloy-based negative electrode active material and a relatively small restraint pressure during actual use of the all-solid-state battery can be obtained.

BRIEF DESCRIPTION OF DRAWINGS

FIG. 1 is a drawing conceptually showing a change in the restraint pressure of the all-solid-state batteries of the Examples and Comparative Example.

DESCRIPTION OF EMBODIMENTS

The embodiments of the present disclosure will be described in detail below. Note that the present disclosure is not limited to the below embodiments. Various modifications can be made within the scope of the present disclosure.

<<Production Method of all-Solid-State Battery>>

In the method for the production of an all-solid-state battery of the present disclosure, produced is an all-solid-state battery having a battery laminate comprising a positive electrode current collector layer, a positive electrode active material layer, a solid electrolyte layer, a negative electrode active material layer, and a negative electrode current collector layer laminated in this order, wherein the battery laminate is restrained in the lamination direction by an actual use restraint member. This negative electrode active material layer contains particles of an alloy-based negative electrode active material.

The method of the present disclosure includes, in this order, the steps of:

charging and discharging the battery laminate in a state in which the battery laminate is restrained in the lamination direction by a manufacturing restraint member, and restraining the battery laminate in the lamination direction by the actual use restraint member, and when a restraint pressure applied by the manufacturing restraint member at the start of the charging is a first restraint pressure, a restraint pressure applied by the manufacturing restraint member at the end of the charging is a second restraint pressure, a restraint pressure applied by the manufacturing restraint member at the start of the discharging is a third restraint pressure, a restraint pressure applied by the manufacturing restraint member at the end of the discharging is a fourth restraint pressure, and a restraint pressure applied by the actual use restraint member at the end of the discharging is a fifth restraint pressure, then the fourth restraint pressure is greater than the fifth restraint pressure.

According to the all-solid-state battery produced by the method of the present disclosure, it is possible to suppress degradation in performance of the all-solid-state battery during actual use, while an alloy-based negative electrode active material is used, and the restraint pressure during actual use of the all-solid-state battery is relatively small. Incidentally, in the method of the present disclosure, a manufacturing restraint member and an actual use restraint member can be same as each other, and can be different from each other.

Though not limited to theory, it is thought that this effect is brought about by the following mechanism. In particular, since there are particles of the active material that expand and contract by the charging and discharging reaction, and other particles that do not expand and contract in the active material layer of the all-solid-state battery, it is thought that the arrangement of these particles in the active material layer changes due to the charging and discharging reaction and voids are formed between these particles, whereby the performance of the all-solid-state battery is degraded. In this regard, it is conceivable that the degree of change in the arrangement of the particles during the manufacturing stage and the formation of the voids due to this change are large. Thus, it is considered that by applying a large restraining pressure during the manufacturing stage, the formation of voids in the active material layer can be effectively suppressed. Specifically, it is considered that when the restraint pressure at the end time of the discharging during the manufacturing stage, i.e., the fourth restraint pressure in which the particles of the alloy-based negative electrode active material are contracted, is relatively large, the negative electrode active material in the negative electrode active material layer, the particles of the solid electrolyte, etc., are stabilized in a densely arranged state, and as a result, even if the restraint pressure applied by the actual use restraint member is relatively small, this densely arranged state can be stably maintained during charging and discharging during actual use.

Note that, before initial charging is performed, the alloy-based negative electrode active material contained in the negative electrode active material layer is crystalline. This crystalline alloy-based negative electrode active material bonds with ions which give and receive electrons, for example, lithium ions, causing a change in form due to amorphization, and expands during charging. The alloy-based negative electrode active material repeatedly expands and contracts while absorbing and releasing lithium ions, and maintains the amorphized state during the subsequent charging and discharging.

The step of charging and discharging in which the battery laminate is restrained by the manufacturing restraint member may be the initial charging and discharging of the all-solid-state battery.

Regarding the present disclosure, "manufacturing restraint member" means a member for restraining the battery laminate during the manufacturing stage before the actual use of the all-solid-state battery. Furthermore, "actual use restraint member" means a member for restraining the battery laminate in the actual usage stage of the all-solid-state battery in practical applications such as hybrid cars and electric vehicles.

In the method of the present disclosure, it is necessary that the step of charging and discharging in which the battery laminate is restrained by the manufacturing restraint member and the step in which the battery laminate is restrained by the actual use restraint member be included in this order. Thus, other steps may be included before these steps, between these steps, and/or after these steps. For example, in the method of the present disclosure, a charging step and/or a discharging step which does not satisfy the requirements of the method of the present disclosure may be further performed. Furthermore, in the method of the present disclosure, a step of enclosing the battery laminate in a pouch container, degassing the pouch container, sealing the pouch container, or the like may be performed.

<Restraint Pressure>

The first through fifth restraint pressures can be arbitrarily determined, as long as the fourth restraint pressure is higher than the fifth restraint pressure, and may be, for example, as described below.

The fourth restraint pressure is higher than the fifth restraint pressure and, for example, the fourth restraint pressure may be 1.25 times or more, 2.00 times or more, 3.00 times or more, 4.00 times or more, 6.00 times or more, 8.00 times or more, 10.00 times or more, 12.00 times or more, 14.00 times or more, or 16.00 times or more, and may be 30.00 times or less, 28.00 times or less, 26.00 times or less, 24.00 times or less, 22.00 times or less, or 20.00 times or less of the fifth restraint pressure.

The first through fourth restraint pressures may be higher than the fifth restraint pressure. For example, the first through fourth restraint pressures may be 1.25 times or more, 2.00 times or more, 3.00 times or more, 4.00 times or more, 6.00 times or more, 8.00 times or more, 10.00 times or more, 12.00 times or more, 14.00 times or more, or 16.00 times or more, and may be 30.00 times or less, 28.00 times or less, 26.00 times or less, 24.00 times or less, 22.00 times or less, or 20.00 times or less of the fifth restraint pressure.

The fifth restraint pressure may be 0.1 MPa or more, 0.5 MPa or more, 1.0 MPa or more, 2.0 MPa or more, 3.0 MPa or more, 4.0 MPa or more, or 5.0 MPa or more, and 10.0 MPa or less, 9.0 MPa or less, 8.0 MPa or less, 7.0 MPa or less, 6.0 MPa or less, or 5.0 MPa or less.

The restraint by the manufacturing member can be performed by interposing the battery laminate in the lamination direction between two restraining plates and fastening the two restraining plates with fasteners. The form of restraint is not particularly limited.

The restraint by the manufacturing restraint member can be the fixation of the two restraining plates so that the distance between the two restraining plates is substantially constant.

When the distance between the two restraining plates is constant, as the alloy-based negative electrode active material absorbs lithium ions and the like, and becomes alloys and expands along with charging, the restraint pressure increases; and as the alloy-based negative electrode active material releases lithium ions and the like and contracts along with discharging, the restraint pressure decreases.

Thus, when the distance between the two restraining plates is substantially constant, the restraint pressure of the battery laminate increases from the first restraint pressure to the second restraint pressure. In this case, the third restraint pressure is the same as the second restraint pressure. Furthermore, in this case, the restraint pressure of the laminate decreases from the third restraint pressure to the fourth restraint pressure along with discharging.

Note that the restraining by the manufacturing restraint member can be performed so that, for example, the restraint pressure between the two restraining plates is substantially constant, or the restraint pressure between the two restraining plates can be adjusted in an adjustable manner.

In the method for the production of an all-solid-state battery of the present disclosure, the step of laminating the positive electrode current collector layer, the positive electrode active material layer, the solid electrolyte layer, the negative electrode active material layer, and the negative electrode current collector layer is not particularly limited and a known method can be used.

<All-Solid-State Battery>

The battery laminate of the all-solid-state battery produced by the method of the present disclosure may be any of various battery laminates and is not particularly limited as long as particles of an alloy-based negative electrode active material are included in the negative electrode active material layer. Examples of each of the elements of the all-solid-state battery produced by the method of the present disclosure will be explained below.

(Positive Electrode Current Collector Layer)

As examples of the positive electrode current collector layer, various metals such as silver, copper, gold, aluminum, nickel, iron, stainless steel, titanium, etc., and alloys thereof may be used without particular limitation. Aluminum foil is preferable as the positive electrode current collector layer from the viewpoint of chemical stability and the like.

The positive electrode current collector layer may further contain deposited nickel (Ni), chromium (Cr), carbon (c), or the like.

(Positive Electrode Active Material Layer)

The positive electrode active material layer contains a positive electrode active material, and optionally a solid electrolyte, a conductive aid, and a binder.

In the positive electrode active material layer, the ratio of the positive electrode active material and the solid electrolyte may be a mass ratio of 85:15 to 30:70 and is preferably 80:20 to 50:50.

The thickness of the positive electrode active material layer is not particularly limited and may be 0.1 μm or more, 1 μm or more, 5 μm or more, 10 μm or more, 20 μm or more, or 30 μm or more and 10,000 μm or less, 1,000 μm or less, 500 μm or less, 300 μm or less, or 100 μm or less.

As examples of the positive electrode active material, a lithium metal oxide containing lithium and at least one transition metal selected from manganese, cobalt, nickel and titanium, for example, lithium cobalt oxide ($Li_xCoO_2$), lithium nickel oxide ($LiNO_2$), lithium manganate ($LiMn_2O_4$), a spinel-type lithium manganate substituted with a different element having a composition represented by $Li_{1+x}M_yMn_{2-x-y}O_4$ (where M=Al, Mg, Fe, Cr, Co, Ni or Zn), lithium titanate ($Li_xTiO_y$), lithium metal phosphate ($LiMPO_4$; where M=Fe, Mn, Co or Ni), and nickel cobalt lithium manganate ($Li_{1+x}Ni_{1/3}Co_{1/3}Mn_{1/3}O_2$) and combinations thereof may be used.

Examples of the average particle diameter of the particles of the positive electrode active material are not particularly limited, and may be, from the viewpoint of increasing the contact area of the solid-solid interface, for example, 100 μm or less, 50 μm or less, 30 μm or less or 20 μm or less.

Furthermore, the average particle diameter may be 1 μm or more, 3 μm or more, 4 μm or more, 5 μm or more, or 10 μm or more.

Note that, in the present disclosure, the term "average particle diameter" means, unless otherwise specified, the arithmetic average value of the measured circle equivalent diameters (Heywood diameter) of 10 or more, 100 or more, or 1,000 or more randomly selected particles as measured by means of scanning transmission electron microscopy (STEM) or the like.

Further, the particles of the positive electrode active material may be optionally coated with a buffer film. It is preferable that the buffer film exhibit electronic insulation and ionic conductivity and have an anionic species that has a strong force to restrain cations, and additionally, the buffer film is preferably capable of maintaining a film form that is stable and does not flow with respect to the particles of the positive electrode active material and the solid electrolyte. Examples of materials for the buffer film include $LiNbO_3$, $Li_4Ti_5O_{12}$, $Li_3PO_4$, etc., and combinations thereof.

The thickness of the buffer film is not particular limited and may be, for example 1 nm or more, 2 nm or more, or 3 nm or more and/or 100 nm or less, 50 nm or less, or 20 nm or less.

Note that the thickness of the buffer film can be measured by transmission electron microscopy (TEM) or the like.

As examples of the solid electrolyte, sulfide-based amorphous solid electrolytes, for example, $Li_2S$—$SiS_2$, LiI—$Li_2S$—$SiS_2$, LiI—$Li_2S$—$P_2S_5$, LiI—LiBr—$Li_2S$—$P_2S_5$, $Li_2S$—$P_2S_5$—LiI—LiBr, $Li_2S$—$P_2S_5$—$GeS_2$, LiI—$Li_2S$—$P_2O_5$, LiI—$Li_3PO_4$—$P_2S_5$, and $Li_2S$—$P_2S_5$ and the like, and sulfide-type crystalline solid electrolytes, for example, $Li_{10}GeP_2S_{12}$, $Li_7P_3S_{11}$, $Li_3PS_4$, $Li_{3.25}P_{0.75}S_4$, and the like, and combinations thereof, may be used. The solid electrolyte may be a glass or crystallized glass (glass ceramic).

The average particle diameter of the particles of the solid electrolyte is not particularly limited, and may be, from the viewpoint of increasing the contact area of the solid-solid interface between particles, for example, 300 μm or less, 200 μm or less, 100 μm or less, 50 μm or less, m or less, 20 μm or less, 10 μm or less, 6 μm or less, or 3 μm or less. Furthermore, the average particle diameter may be 0.1 μm or more, 0.2 μm or more, 0.3 μm or more, or 0.5 μm or more.

As examples of the conductive aid, carbonaceous materials, for example, VGCF (vapor grown carbon fiber), carbon black, acetylene black (AB), Ketjen Black (KB), carbon nanotubes (CNT), carbon nanofibers (CNF), and the like, metal materials, etc., and combinations thereof may be used.

The binder is not particularly limited and polymer resins, for example, polyvinylidene fluoride (PVdF), butadiene rubber (BR), styrene butadiene rubber (SBR), and combinations thereof may be used.

(Solid Electrolyte Layer)

The solid electrolyte layer includes a solid electrolyte and optionally a binder. Regarding the solid electrolyte and the binder, refer to the description regarding the positive electrode active material layer.

The thickness of the solid electrolyte layer is not particularly limited and may be 0.1 μm or more, 1 μm or more, 5 μm or more, or 10 μm or more, and may be 10,000 μm or less, 1,000 μm or less, 500 μm or less, or 300 μm or less.

(Negative Electrode Active Material Layer)

The negative electrode active material layer includes the alloy-based negative electrode active material, and optionally, the conductive aid and the binder. The negative electrode active material layer may include a negative electrode active material other than the alloy-based negative electrode active material.

In the negative electrode active material layer, the ratio of the of the negative electrode active material and the solid electrolyte may be 85:15 to 30:70, preferably 80:20 to 40:50, on a mass ratio basis.

In the present specification, "alloy-based negative electrode active material" means a negative electrode active material that reacts with ions that exchange electrons, for example, lithium ions, to form an alloy.

The alloy-based negative electrode active material is not particularly limited as long as it is capable of occluding and releasing ions that give and receive electrons, such as lithium ions. The alloy-based negative electrode active material can include, for example, silicon (Si), tin (Sn), zinc (Zn), gallium (Ga), germanium (Ge), aluminum (Al), indium (In) and combinations thereof.

As examples of negative electrode active materials other than the alloy-based negative electrode active material, carbonaceous materials, for example, carbon, hard carbon, soft carbon, graphite, etc., and combinations thereof may be used.

Regarding the solid electrolyte, the conductive aid, and the binder of the negative electrode active material layer, refer to the description regarding the positive electrode active material layer. Regarding the thickness of the negative electrode active material layer, refer to the description regarding the positive electrode active material layer.

(Negative Electrode Current Collector Layer)

The negative electrode current collector layer is not particularly limited, and may be any of various metals, for example, silver, copper, gold, aluminum, nickel, iron, stainless steel, titanium, etc., and alloys thereof. Copper foil is preferable as the negative electrode current collector layer from the viewpoint of chemical stability and the like.

The negative electrode current collector layer may further contain deposited nickel (Ni), chromium (Cr), carbon (C), etc.

The present disclosure will be described in more detail with reference to the following Examples. Needless to say, the scope of the present disclosure is not limited to these Examples.

EXAMPLES

<Production of the Battery Laminate>
(Positive Electrode Active Material Layer Preparation Process)

A positive electrode mixture as the raw material of the positive electrode active material layer was placed into a container made of polypropylene (PP). A positive electrode active material slurry was prepared by agitating the positive electrode mixture for a total of 30 seconds using an ultrasonic dispersing device (model: UH-50, manufactured by SMT Co., Ltd.) and shaking for a total of 30 minutes with a shaker (model: TTM-1, manufactured by Shibata Scientific Co., Ltd.), and repeating the agitating and shaking once again.

This positive electrode active material slurry was spread onto an aluminum foil as a positive electrode current collector layer by a blade method using an applicator. The foil was then dried on a hot plate at 100° C. for 30 minutes to obtain a positive electrode active material layer formed on an aluminum foil as a positive electrode current collector layer.

The composition of the positive electrode mixture is shown below:
butyl butyrate as the dispersion medium;
a butyl butyrate solution (5% by mass) of a polyvinylidene fluoride binder as the binder;
$LiNi_{1/3}Co_{1/3}Mn_{1/3}O_2$ (average particle diameter 6 μm) as the positive electrode active material;
$Li_2S$—$P_2S_5$ glass ceramic as the solid electrolyte; and
vapor grown carbon fiber as the conductive aid.

(Negative Electrode Active Material Layer Preparation Process)

A negative electrode mixture as the raw material of the negative electrode active material layer was placed into a container made of polypropylene (PP). A negative electrode active material slurry was prepared by agitating the negative electrode mixture for a total of 30 seconds using an ultrasonic dispersing device (model: UH-50, manufactured by SMT Co., Ltd.) and shaking for 30 minutes with a shaker (model: TTM-1, manufactured by Shibata Scientific Co., Ltd.).

This negative electrode active material slurry was spread onto a copper foil as a current collector layer by a blade method using an applicator. The foil was then dried on a hot plate at 100° C. for 30 minutes to obtain a negative electrode active material layer formed on a copper foil as a negative electrode current collector layer.

The composition of the negative electrode mixture is shown below:
butyl butyrate as the dispersion medium;
a butyl butyrate solution (5% by mass) of a polyvinylidene fluoride binder as the binder;
vapor grown carbon fiber as the conductive aid;
silicon (Si) particles as the particles of an alloy-based negative electrode active material, and
$Li_2S$—$P_2S_5$ glass ceramic as the solid electrolyte.

(Solid Electrolyte Layer Preparation Process)

A solid electrolyte mixture as the raw material of the solid electrolyte layer was placed into a container made of polypropylene (PP). A solid electrolyte slurry was prepared by agitating the solid electrolyte mixture for a total of 30 seconds using an ultrasonic dispersing device (model: UH-50, manufactured by SMT Co., Ltd.) and shaking for a total of 30 minutes with a shaker (model: TTM-1, manufactured by Shibata Scientific Co., Ltd.).

This solid electrolyte slurry was spread onto an aluminum foil as a release sheet by a blade method using an applicator. The foil was then dried on a hot plate at 100° C. for 30 minutes to obtain a solid electrolyte layer formed on the release sheet.

The composition of the solid electrolyte mixture is shown below:
heptane as the dispersion medium;
a heptane solution (5% by mass) of a butadiene rubber-type binder as the binder; and
$Li_2S$—$P_2S_5$ glass ceramic as the solid electrolyte.

(Positive Electrode Laminate Preparation Process)

The above-described positive electrode current collector layer, positive electrode active material layer, and solid electrolyte layer were stacked in this order. This laminate was set in a roll press machine and pressed at a press pressure of 20 kN/cm (about 710 MPa) and a press temperature of 165° C. to obtain a positive electrode laminate.

(Negative Electrode Laminate Preparation Process)

The above-described solid electrolyte layer, negative electrode active material layer, and copper foil as negative electrode current collector layer were stacked in this order. This laminate was set in a roll press machine and pressed at a press pressure of 20 kN/cm (about 710 MPa) and a press temperature of 25° C. to obtain a negative electrode laminate.

Further, the solid electrolyte layer formed on the release sheet was laminated as an additional solid electrolyte layer onto the solid electrolyte layer side of the negative electrode laminate. This laminate was set in a planar uniaxial pressing machine and temporarily pressed at 100 MPa and 25° C. for 10 seconds. The release sheet was peeled off from this laminate to obtain a negative electrode laminate having an additional solid electrolyte layer.

Note that the negative electrode laminate and the positive electrode laminate were produced so that the area of the negative electrode laminate was larger than the area of the positive electrode laminate.

(Battery Laminate Production Process)

The positive electrode laminate and the negative electrode laminate having the additional solid electrolyte layer were laminated so that the additional solid electrolyte layer was interposed between the positive electrode laminate and the negative electrode laminate. This laminate was set in a planar uniaxial pressing machine and pressed at a press pressure of 200 MPa and a press temperature of 120° C. for one minute to obtain a battery laminate.

Examples 1 to 4 and Comparative Example

Battery laminates obtained as described above were interposed between two restraining plates as manufacturing restraint members and the two restraining plates were clamped by fasteners to the first restraint pressure shown in Table 1 to fix the distance between the two restraining plates.

Thereafter, charging for the production and discharging for the production was performed for the battery laminates of Examples 1 to 4 and the Comparative Example, which were restrained by such manufacturing restraint members, as described below.

The charging for the production: constant-current charging to 4.55 V at 1/10 C (10 hours rate), followed by constant-voltage charging at 4.55 V to a termination current of 1/100 C (100 hours rate).

The discharging for the production: constant-current discharging to 2.5 V at 1/10 C (10 hours rate), followed by constant-voltage discharging at 2.5 V to a termination current of 1/100 C (100 hours rate).

Changes in restraint pressure associated with this charging for the production and discharging for the production are shown in Table 1 below. Furthermore, FIG. 1 conceptually shows the changes in restraint pressure during the charging for the production and the discharging for the production.

Restraint pressure at the start time of the charging for the production: first restraint pressure:
restraint pressure at the end time of the charging for the production: second restraint pressure:
restraint pressure at the start time of the discharging for the production: third restraint pressure; and
restraint pressure at the end time of the discharging for the production: fourth restraint pressure.

As shown in Table 1 and FIG. 1, regarding the battery laminates of Examples 1 to 4, after the discharging for the production, the restraint by the restraining member was relaxed, and the restraint pressure changed from the fourth restraint pressure to the fifth restraint pressure. Furthermore, as shown in Table 1 and FIG. 1, regarding the battery laminate of the Comparative Example, the restraint pressure by the restraining member was not changed between the fourth restraint pressure and the fifth restraint pressure.

Charging and discharging were performed so as to simulate actual use in the state in which the restraint pressure of the battery laminate was set to the fifth restraint pressure.

Simulated actual use charging: constant-current charging to 4.35 V at 1/10 C (10 hours rate), followed by constant-voltage charging at 4.35 V to a termination current of 1/100 C (100 hours rate).

Simulated actual use discharging: constant-current discharging to 3.0 V at 1/10 C (10 hours rate), followed by constant-voltage discharging at 3.0 V to a termination current of 1/100 C (100 hours rate).

After the charging and discharging simulating actual use, the charging state was adjusted as follows.

Charging state adjustment charging: constant-current charging to 3.9 V at 1/10 C (10 hours rate), followed by constant-voltage charging at 3.9 V to a termination current of 1/100 C (100 hours rate).

Charging State adjustment discharging: constant-current discharging to 3.7 V at 1/10 C (10 hours rate), followed by constant-voltage discharging at 3.7 V to a termination current of 1/100 C (100 hours rate).

Regarding the battery laminate for which the charging state has been adjusted, a current of 17.15 mA/battery laminate-cm$^2$ was flowed for 5 seconds, and the voltage change before and after was divided by the current value to obtain a resistance value, which was taken as the initial resistance value.

Regarding the battery laminate the initial resistance of which was measured, the following durability charging and discharging was repeated 300 times.

Durability charging: constant-current charging to 4.17 V at 1/10 C (10 hours rate), followed by constant-voltage charging at 4.17 V to a termination current of 1/100 C (100 hours rate).

Durability discharging: constant-current discharging to 3.17 V at 1/10 C (10 hours rate), followed by constant-voltage discharging at 3.17 V to a termination current of 1/100 C (100 hours rate).

After durability charging and discharging, the above described charging state adjusting was performed.

Regarding the battery laminate for which the charging state has been adjusted, the resistance value was obtained as described above, and this value was taken as the resistance value after the durability test.

Based on the initial resistance value and resistance after durability charging and discharging measured as described above, the resistance increase rate was obtained as follows.
Resistance increase rate (%)=resistance value after durability charging and discharging (Ω) /initial resistance value (Ω)×100.

The resistance increase rates of the thus obtained battery laminates of Examples 1 to 4 and the Comparative Example were further converted into relative resistance increase rates using the resistance increase rate of the battery laminate of the Comparative Example as a baseline (100%), which are shown together with the first to fifth restraint pressures in Table 1. This small relative increase rate means that degradation of the battery laminate due to durability charging and discharging has been suppressed.

TABLE 1

| | Restraint Pressure (MPa) (Ratio to the Fifth Restraint Pressure (—)) | | | | | Relative Resistance Increase |
|---|---|---|---|---|---|---|
| | First | Second | Third | Fourth | Fifth | Rate (%) |
| Example 1 | 7.5 (1.5) | 18 (3.6) | 18 (3.6) | 10 (2.0) | 5 (—) | 94 |
| Example 2 | 10 (2.0) | 21 (4.2) | 21 (4.2) | 13 (2.6) | 5 (—) | 92 |
| Example 3 | 20 (4.0) | 31 (6.2) | 31 (6.2) | 22 (4.4) | 5 (—) | 74 |
| Example 4 | 75 (15.0) | 84 (16.8) | 84 (16.8) | 77 (15.4) | 5 (—) | 72 |
| Comparative Example 1 | 5 (0.6) | 16 (1.9) | 16 (1.9) | 8.5 (1.0) | 8.5 (—) | 100 |

From table 1, it can be understood that in the battery laminates of Examples 1 to 4, in which the fourth restraint pressure (the restraint pressure at the end time of the discharging for the production) was greater than the fifth restraint pressure (the restraint pressure at the end time of discharging for actual use), an increase in the electrical resistance of the battery laminates due to the durability charging and discharging was suppressed, as compared with the battery laminate of the Comparative Example, in which the fourth restraint pressure was the same as the fifth restraint pressure, i.e., degradation of the battery laminates due to the durability charging and discharging was suppressed.

Furthermore, despite the fact that the fifth restraint pressure of the battery laminates of Examples 1 to 4 was smaller than the fifth restraint pressure of the battery laminate of the Comparative Example, degradation of the battery laminates was suppressed, which indicates that the degradation of the battery laminates is remarkably suppressed as a result of the fourth restraint pressure being larger than the fifth restraint pressure.

Examples 5 to 7 and the Comparative Example

As shown in Table 2 and FIG. 1, after the charging for the production, the restraining by the restraint member was increased, and the restraint pressure was changed from the second restraint pressure to the third restraint pressure. Thereafter, after the discharging for the production, the restraining by the restraint member was relaxed, and the restraint pressure was changed from the fourth restraint pressure to the fifth restraint pressure. Furthermore, as shown in Table 2 and FIG. 1, regarding the battery laminate of the Comparative Example, the restraint pressure by the restraining member was unchanged between the second restraint pressure and the third restraint pressure and was unchanged between the fourth restraint pressure and the fifth restraint pressure.

1 Like Examples 1 to 4 and the Comparative Examples, the relative resistance increase rates of Examples 5 to 7 were determined and are shown in Table 2 together with the first to fifth restraint pressures. This small relative increase rate means that degradation of the battery laminate due to durability charging and discharging has been suppressed.

TABLE 2

| | Restraint Pressure (MPa) (Ratio to the Fifth Restraint Pressure (—)) | | | | | Relative Resistance Increase |
|---|---|---|---|---|---|---|
| | First | Second | Third | Fourth | Fifth | Rate (%) |
| Example 5 | 5 (1.0) | 16 (1.0) | 25 (5.0) | 17 (3.4) | 5 (—) | 94 |
| Example 6 | 5 (1.0) | 16 (1.0) | 45 (9.0) | 35 (7.0) | 5 (—) | 79 |
| Example 7 | 5 (1.0) | 16 (1.0) | 75 (15.0) | 65 (13.0) | 5 (—) | 69 |
| Comparative Example 1 | 5 (0.6) | 16 (1.9) | 16 (1.9) | 8.5 (1.0) | 8.5 (—) | 100 |

From Table 2, it can be understood that for the battery laminates of Examples 5 to 7, in which the fourth restraint pressure (the restraint pressure at the end time of the discharging for the production) was greater than the fifth restraint pressure (the restraint pressure at the end time of discharging for actual use), an increase in the electrical resistance of the battery laminates due to the durability charging and discharging was suppressed, as compared with the battery laminate of the Comparative Example, in which the fourth restraint pressure was the same as the fifth restraint pressure, i.e., degradation of the battery laminates due to the durability charging and discharging was suppressed.

Furthermore, despite the fact that the fifth restraint pressures of the battery laminates of Examples 5 to 7 were smaller than the fifth restraint pressure of the battery laminate of the Comparative Example, degradation of the battery laminates was suppressed, which indicates that the degradation of the battery laminates was remarkably suppressed as a result of the fourth restraint pressure being larger than the fifth restraint pressure.

Furthermore, despite the fact that the first restraint pressures of the battery laminates of Examples 5 to 7 were the same as the first restraint pressure of the battery laminate of the Comparative Example, degradation of the battery laminates was suppressed, which indicates that the degradation of the battery laminates was remarkably suppressed as a result of the fourth restraint pressure being larger than the fifth restraint pressure.

The invention claimed is:

1. A method for the production of an all-solid-state battery having a battery laminate comprising a positive electrode current collector layer, a positive electrode active material layer, a solid electrolyte layer, a negative electrode active material layer, and a negative electrode current collector layer laminated in this order, the battery laminate being restrained in the lamination direction by an actual use restraint member, wherein
the negative electrode active material layer contains particles of an alloy-based negative electrode active material,
the method comprises the following steps in the following order:
charging and discharging the battery laminate in a state in which the battery laminate is restrained in the lamination direction by a manufacturing restraint member, and
restraining the battery laminate in the lamination direction by the actual use restraint member, and
when
a restraint pressure applied by the manufacturing restraint member at the start of the charging is a first restraint pressure, a restraint pressure applied by the manufacturing restraint member at the end of the charging is a second restraint pressure, a restraint pressure applied by the manufacturing restraint member at the start of the discharging is a third restraint pressure, a restraint pressure applied by the manufacturing restraint member at the end of the discharging is a fourth restraint pressure, and a restraint pressure applied by the actual use restraint member at the end of the discharging is a fifth restraint pressure, then the fourth restraint pressure is greater than the fifth restraint pressure.

2. The method for production according to claim 1, wherein the fourth restraint pressure is 1.25 times or more of the fifth restraint pressure.

3. The method for production according to claim 1, wherein the fourth restraint pressure is 30.00 times or less of the fifth restraint pressure.

4. The method for production according to claim 1, wherein the first through fourth restraint pressures are greater than the fifth restraint pressure.

5. The method for production according to claim 4, wherein the first through fourth restraint pressures are 1.25 times or more of the fifth restraint pressure.

6. The method for production according to claim 4, wherein the first through fourth restraint pressures are 30.00 times or less of the fifth restraint pressure.

7. The method according to claim 1, wherein the fifth restraint pressure is 10 MPa or less.

8. The method according to claim 1, wherein the fifth restraint pressure is 0.1 MPa or more.

9. The method according to claim 1, wherein the step of charging and discharging in which the battery laminate is restrained by the manufacturing restraint member is an initial charging and discharging of the all-solid-state battery.

10. The method according to claim 1, wherein the alloy-based negative electrode active material includes at least silicon.

* * * * *